United States Patent
Wang et al.

(10) Patent No.: US 6,173,146 B1
(45) Date of Patent: Jan. 9, 2001

(54) DEVELOPER CYLINDER AND DRIVE GEAR ARRANGEMENT

(76) Inventors: Jui-Chi Wang; Robin Hsu; Ya-Li Huang; Kuan-Tung Li, all of No.498,Sec 1,Yung-Shing Rd., Wu-Chi Town, Taichung County (TW)

( * ) Notice: Under 35 U.S.C. 154(b), the term of this patent shall be extended for 0 days.

(21) Appl. No.: 09/490,004

(22) Filed: Jan. 21, 2000

(51) Int. Cl.[7] .................................................. G03G 15/00
(52) U.S. Cl. ......................... 399/265; 399/167; 464/158
(58) Field of Search .................... 399/279, 159, 399/167, 117, 265; 403/359.6, 348; 464/157, 158

(56) References Cited

U.S. PATENT DOCUMENTS

| | | | |
|---|---|---|---|
| 3,815,380 | * | 6/1974 | Esmay .................................. 464/173 |
| 4,454,922 | * | 6/1984 | Jamison et al. ...................... 175/323 |
| 5,128,715 | * | 7/1992 | Furuyama et al. ................... 399/116 |
| 5,848,334 | * | 12/1998 | Kamola ................................ 399/167 |
| 5,903,803 | * | 5/1999 | Kawai et al. ........................ 399/116 |
| 5,926,673 | * | 7/1999 | Foster et al. ........................ 399/167 |
| 5,930,562 | * | 7/1999 | Noda et al. .......................... 399/114 |
| 5,987,287 | * | 11/1999 | Huang ................................. 399/265 |
| 6,029,032 | * | 2/2000 | Watanabe et al. ................... 399/111 |

FOREIGN PATENT DOCUMENTS 10-105022 * 4/1998 (JP) .

* cited by examiner

Primary Examiner—Robert Beatty
(74) Attorney, Agent, or Firm—Pro-Techtor International Services

(57) ABSTRACT

A developer cylinder and drive gear arrangement includes a drive gear having a coupling hole at one end of its gear shaft, and a developer cylinder having a coupling block at its one end coupled to the coupling hole at the gear shaft of the drive gear, wherein the coupling block of the developer cylinder has a plurality of teeth spirally disposed around the periphery thereof.

1 Claim, 2 Drawing Sheets

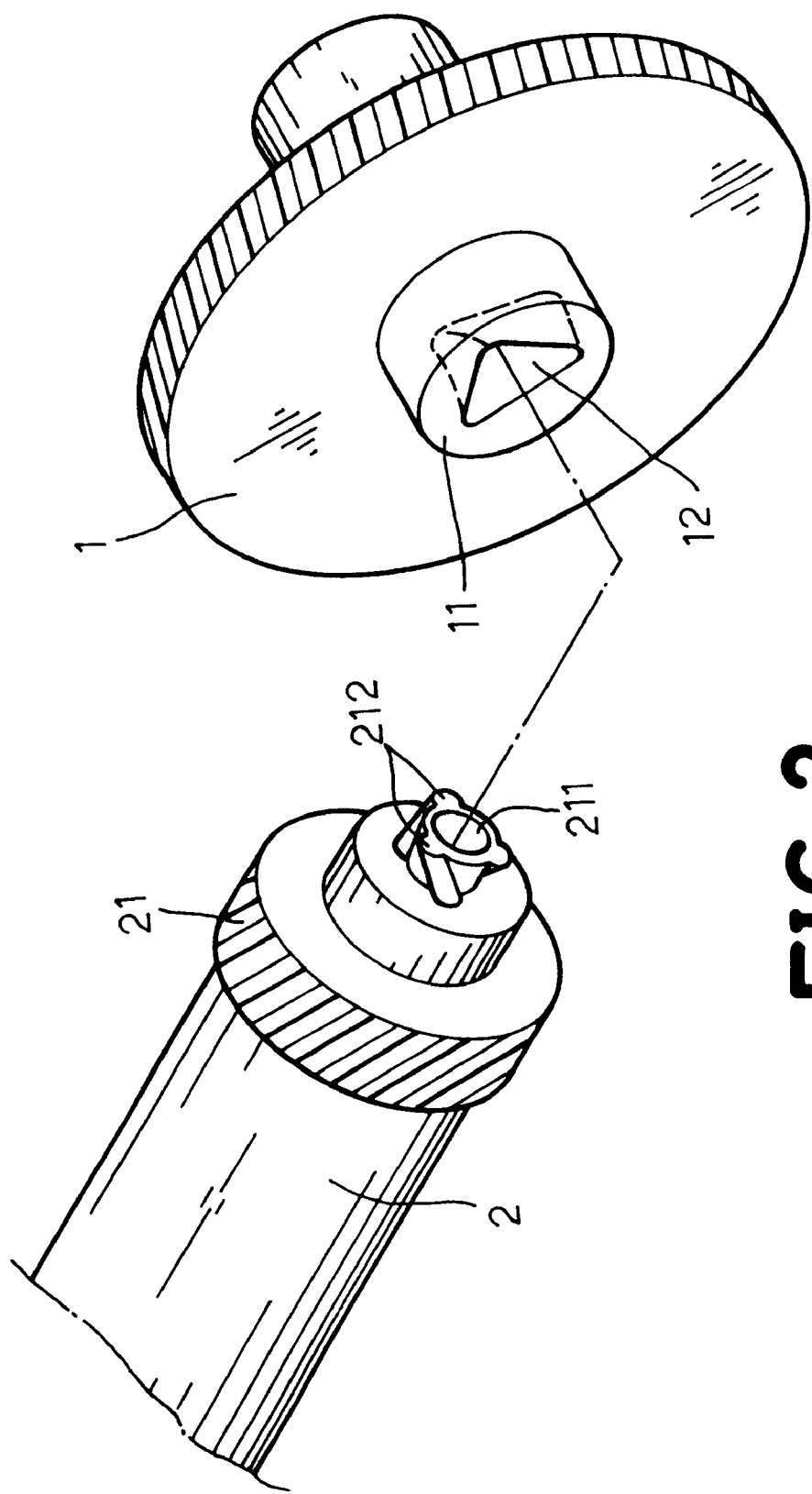

DEVELOPER CYLINDER AND DRIVE GEAR ARRANGEMENT

BACKGROUND OF THE INVENTION

The present invention relates to a developer cylinder and drive gear arrangement used with a developer-replenishing device in a copier, facsimile apparatus, printer or similar electrophotographic image forming apparatus.

FIG. 1 shows a developer cylinder and drive gear arrangement used in the developer-replenishing device of a copier, facsimile apparatus, printer or similar electrophotographic image forming apparatus. This arrangement comprises a drive gear A, and a developer cylinder E driven by the drive gear A. The drive gear A has a gear shaft B at its center. The gear shaft B has a twisted triangular coupling hole C axially disposed on its one end. The developer cylinder E is fixedly mounted with a transmission gear F having a twisted, triangular coupling shaft D axially raised from its one end for coupling to the coupling hole C on the gear shaft B of the drive gear A. Because the developer cylinder E wears quickly with use, it must be replaced when starting to wear, and the transmission gear F should also be replaced. Because the triangular coupling shaft D of the transmission gear F twists in one direction, its fabrication is complicated, resulting in a high manufacturing cost.

SUMMARY OF THE INVENTION

The present invention has been accomplished to provide a developer cylinder, which eliminates the aforesaid problem. It is one object of the present invention to provide a developer cylinder for use with a drive gear in a developer-replenishing device, which can be manufactured through a mass fabrication process. It is another object of the present invention to provide a developer cylinder for use with a drive gear in a developer-replenishing device, which is inexpensive to manufacture. According to the present invention, the coupling shaft of the transmission gear of the developer cylinder has a plurality of teeth spirally disposed around the periphery thereof for enabling the coupling shaft to be positively positioned in the coupling hole on the gear shaft of the drive gear. This design enables the developer cylinder to be quickly injection molded from plastics through a mass fabrication process.

BRIEF DESCRIPTION OF THE DRAWINGS

FIG. 2 is an exploded view of the present invention.

DETAILED DESCRIPTION OF THE PREFERRED EMBODIMENT

Figure 1:
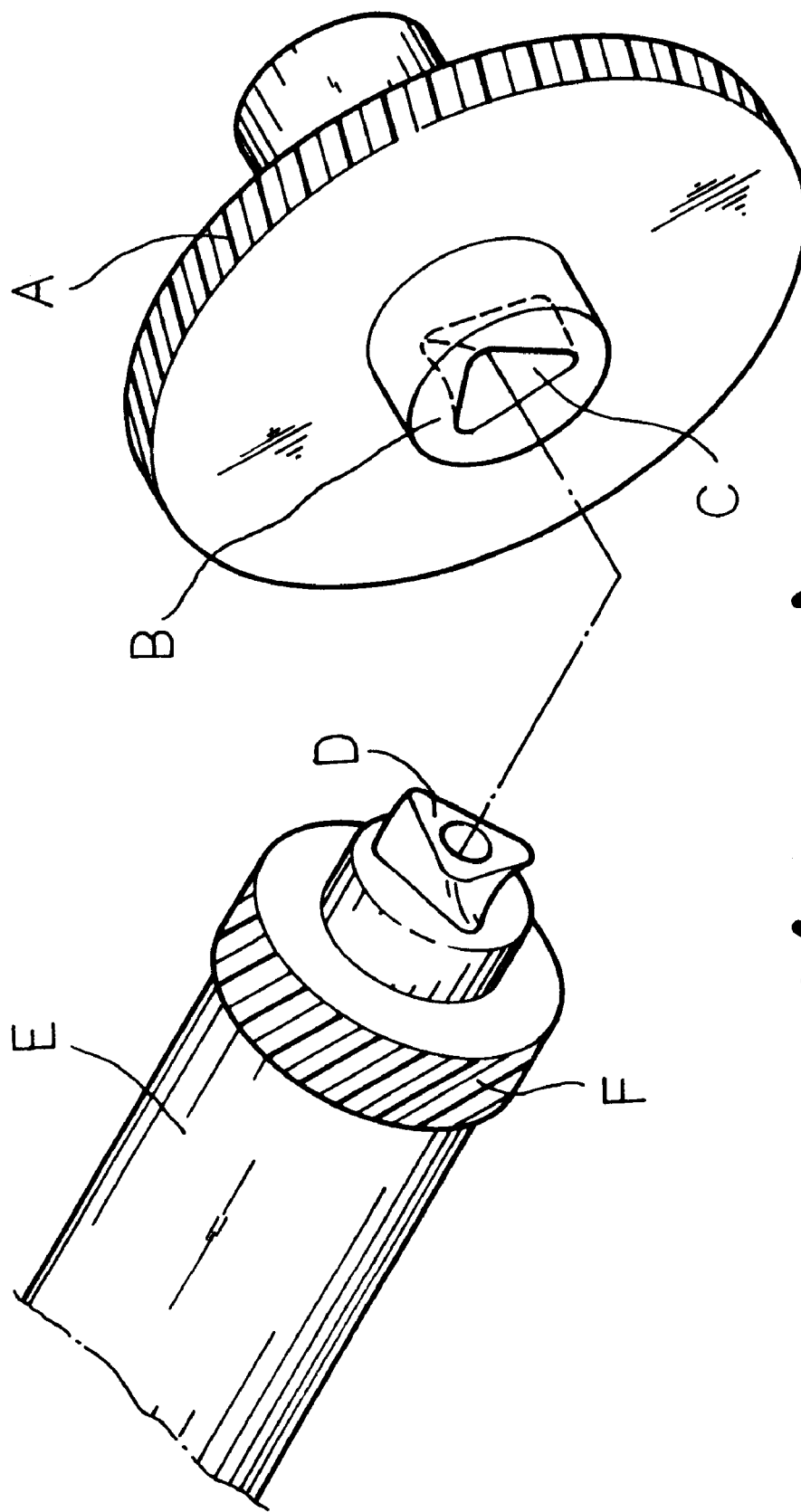
FIG. 1 is an exploded view of the prior art.

Referring to FIG. 2, the present invention comprises a drive gear 1, and a developer cylinder 2. The drive gear 1 comprises a gear shaft 11 at its center. The gear shaft 11 has a twisted, triangular coupling hole 12 axially disposed on its one end. The developer cylinder 2 is fixedly mounted with a transmission gear 21 having a hollow coupling shaft 211 axially raised from its one end for coupling to the triangular coupling hole 12 on the gear shaft 11 of the drive gear 1. The hollow coupling shaft 211 comprises a plurality of teeth 212 spirally spaced around the periphery thereof. Preferably, the number of the teeth 212 is three. After connection of the hollow coupling shaft 211 to the coupling hole 12 on the gear shaft 11, the developer cylinder 2 can be positively rotated with the drive gear 1.

What the invention claimed is:

1. A developer cylinder and drive gear arrangement comprising:
   a drive gear and a developer cylinder driven by said drive gear, said drive gear having a gear shaft with a twisted triangular coupling hole axially disposed on one end of said gear shaft, said developer cylinder having a coupling shaft axially raised from one end thereof and received in said coupling hole in said gear shaft of said drive gear,
   wherein said coupling shaft of said developer cylinder comprises a plurality of teeth spirally disposed around a periphery thereof, said teeth being raised from a cylindrical central body of said coupling shaft, positions of said teeth corresponding to corners of said triangular coupling hole.

* * * * *